Dec. 9, 1947.   H. P. CALDWELL, JR   2,432,281
HF ALKYLATION
Filed Dec. 4, 1945
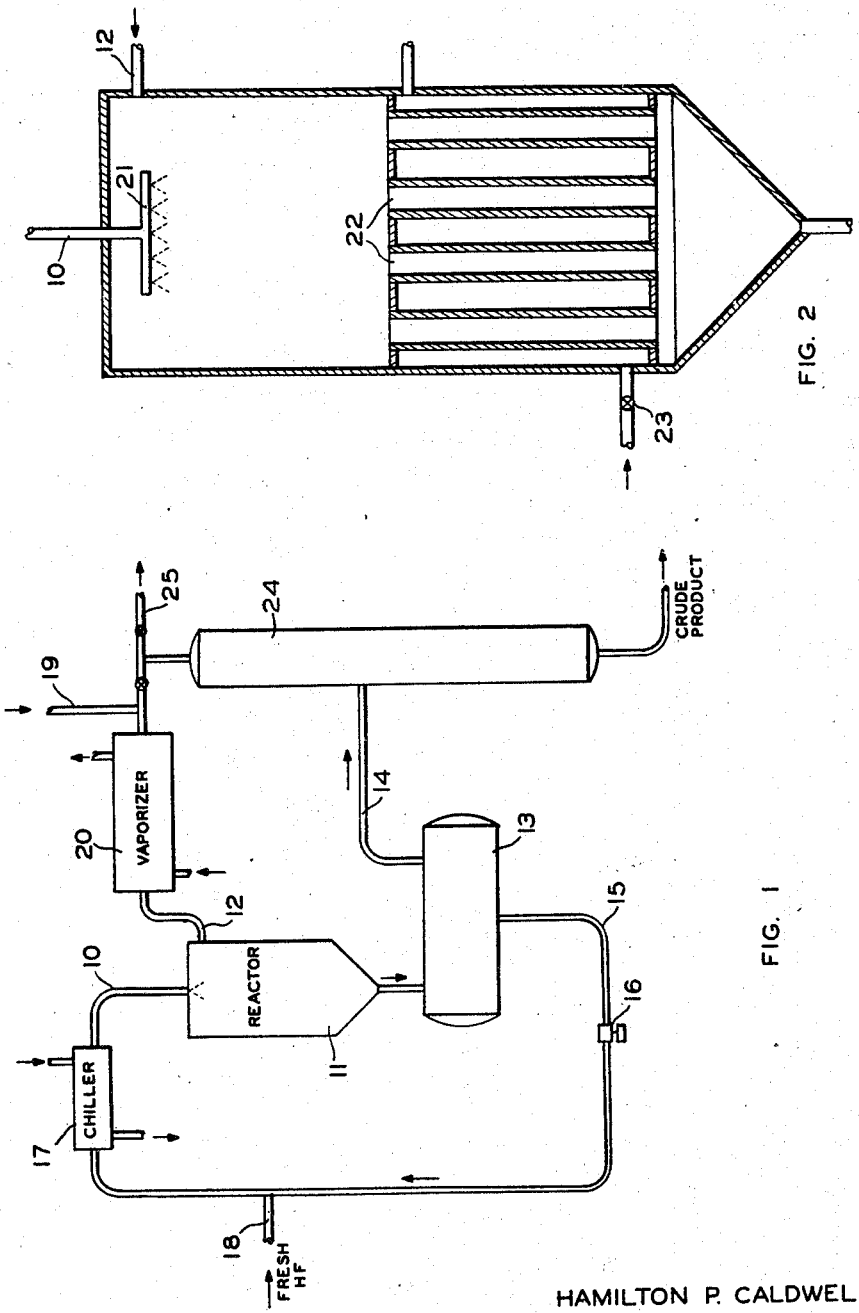
HAMILTON P. CALDWELL, JR.
INVENTOR.
BY Oswald G. Hayes
ATTORNEY Patented Dec. 9, 1947

2,432,281

UNITED STATES PATENT OFFICE 2,432,281

HF ALKYLATION

Hamilton P. Caldwell, Jr., Woodbury, N. J., assignor to Socony-Vacuum Oil Company, Incorporated, a corporation of New York Application December 4, 1945, Serial No. 632,721

4 Claims. (Cl. 260—683.4)

This invention relates to a process for conducting alkylation reaction of isoparaffins and olefins in the presence of hydrogen fluoride and is particularly concerned with such a process characterized by effecting adequate contact of reactants with catalyst by quenching a vapor mixture of the reactants with a cold spray of catalyst.

High quality anti-knock fuel components are produced in large quantities by catalytic alkylation of isoparaffins with olefins, usually in the presence of a liquid acid catalyst. As now practiced, a suitable mixture of the reactants in liquid phase is violently agitated with the catalyst under conditions of temperature and pressure to maintain liquid phase conditions and to promote the desired reaction. The hydrocarbon and the catalyst are mutually immiscible and the reaction mixture is actually a dispersion of one phase in the other. Usually, the hydrocarbon reactants constitute the disperse phase. The reaction vessels are recycling agitators which maintain a large reaction mass in a state of rapid circulation and agitation while a portion of fresh charge and fresh acid is continuously added with continuous withdrawal of a corresponding volume of the circulating mixture.

According to the present invention, a similar reaction is conducted by quenching a stream of gaseous hydrocarbon reactants with a spray of cold hydrogen fluoride in liquid phase which quenches and condenses the vaporous hydrocarbons with concurrent alkylation to form high quality fuel components. Preferably, the direction of gas flow and the direction in which the liquid catalyst is sprayed are concurrent and the two liquid phases are collected together and settled for separation of hydrocarbon product from catalyst. In one particularly desirable modification, the resultant mixture from quenching vaporous reactants with cold catalyst is passed to a condenser wherein any remaining gaseous material is converted to the liquid state.

The present process is less sensitive to isoparaffin-olefin ratio than is the conventional commercial process. The reason for this is not understood, but the data in connection with specific examples set out below show very little variation in alkylate quality with changes in the said ratio. This is an important consideration since the present practice using high ratios requires a great deal of additional equipment and power to handle the excess isoparaffin. The isoparaffin-olefin ratios at the point of reaction in previous processes is probably on the order of 200 to 1 or greater. The difficulties inherent in handling such large excesses are minimized by the fact that the ratio in the feed is much lower and the desired high ratio at the time of reaction is obtained by recirculation of reaction mixture. Nevertheless, large excesses of isoparaffin must be handled in order to give alkylates of suitable quality. By contrast, the present process operates very satisfactorily on isoparaffin excesses at the time of reaction about equivalent to those in the feed of present day commercial operations.

Another outstanding feature of the invention is that the process involves a once-through operation of short contact time. It is well known that hydrogen fluoride induces many secondary reactions when in intimate contact with alkylate, resulting in conversion of primary alkylate to other products, many of which are undesirable. The present process provides the intimate contact of catalyst and hydrocarbon reactants required for the alkylation reaction and separation into two mutually immiscible layers of liquid occurs before substantial degradation of product can occur. The two layers are, of course, in contact at the interface, but the surface of contact is so small compared with that existing during the reaction in this or any other commercially feasible process as to be negligible.

A further advantage of the invention lies in the precise control of reaction conditions that can be exercised. Temperature and pressure are subject to rapid modification by changing temperatures, feed rates, etc., of the gaseous hydrocarbon stream and the cold stream of liquid hydrogen fluoride.

Additional objects and advantages of the invention will be clear from the detailed discussion below of specific embodiments of the invention; adapted to be conducted in apparatus shown in the annexed drawings, wherein:

Figure 1 is a simplified diagrammatic showing of apparatus for the process; and

Figure 2 is a vertical section of a preferred type of reaction chamber.

Referring specifically to Figure 1, cold liquid hydrogen fluoride is admitted by pipe 10 to a spraying device in the top of reactor 11, wherein it contacts a vaporous mixture of isoparaffin and olefin reactants admitted to the reactor by pipe 12. The amounts and temperatures of the liquid hydrogen fluoride and vaporous reactants are so adjusted as to result in substantially complete condensation. The chilling effect of the catalyst may be augmented by cooling coils, jackets and the like, but in any event, the net result should be substantially complete condensation of the hydrogen fluoride and hydrocarbons to form a two-phase liquid body in the body of the reactor.

Settling of the condensate to separate the hydrocarbon phase from the hydrogen fluoride phase may be conducted in the bottom of the reactor and the two phases separately withdrawn, but it is preferable to pass the liquid to a separate settling zone 13 from which a hydrocarbon phase is withdrawn by pipe 14 while line 15 conducts catalyst, by way of pump 16, to a chiller 17 for return to reactor 11 through pipe 10. Fresh hydrogen fluoride may be added at 18 and it is to be understood that the catalyst recycle line will include the usual provision for regeneration of at least a part of the recycled catalyst to remove tars, water, and other undesirable materials. The hydrocarbon phase from settler 13 passes to a fractionating system, represented in Figure 1 by the column 24, wherein a crude alkylate product is separated for further processing to yield the desired fuel and unreacted isoparaffin is taken overhead to be recycled to the reactor. Fresh feed containing isoparaffin and olefin in suitable amounts to give the desired charge when mixed with recycled isoparaffin is added at 19 and the mixture passed through vaporizer 20 to the reactor. If excessive amounts of isoparaffin build up in the system due to composition of the fresh feed, a portion of the overhead from column 24 may be withdrawn as desired by line 25.

Figure 2 illustrates a preferred reaction chamber having a spray head 21 for supplying cold hydrogen fluoride from pipe 10. In the lower portion of the reactor is a group of tubes 22 which serve as a condenser to convert the residual gases to liquid for transfer to the settler. Any desired cooling medium may be circulated about the tubes 22 and in the specific embodiment shown, cooling of the tubes 22 is satisfactorily done by evaporation of a suitable refrigerant admitted by expansion valve 23. It will be apparent that a hydrocarbon, such as feed for the reaction may be used as the refrigerant.

*Example I*

A hydrocarbon charge mixture of isobutane and butenes in molar ratio of 5.8 to 1 was supplied to the reactor at 170° F. and 85 lbs. gauge at a pumping rate of 27.3 cc. per minute. Liquid hydrogen fluoride at 58° F. was sprayed into the vapor at the rate of 165 cc. per minute. The two-phase reaction mixture was found to have a temperature of 88° F. and was stratified to separate hydrocarbon from hydrogen fluoride. The hydrocarbon layer was neutralized with ammonia and analyzed by distillation. It was found that 54.3% of the alkylate boiled in the octane range and the depentanized alkylate contained 0.005% fluorine.

*Example II*

This example was generally similar to that preceding except that a smaller amount of hydrogen fluoride at lower temperature was used. Hydrocarbon feed at 180° F. was supplied at 28.9 cc. per minute and 108 cc. per minute of hydrogen fluoride at 40.7° F. were sprayed into the reactor giving a settler temperature of 90.5° F. A slightly smaller yield of alkylate was obtained having a somewhat higher percentage of fluorine. The product was more saturated having a Norwood bromine number of 0.0.

*Example III*

A high quality alkylate was made according to the present process using an isobutane to butene ratio of 2.95 to 1. Hydrocarbon feed at 162° F. was supplied at the rate of 28.6 cc. per minute while acid at 39.2° F. was sprayed at the rate of 183 cc. per minute. About half of the alkylate (47.5%) boiled in the octane range and the bromine number was found to be extremely low (0.0006% fluorine on depentanized alkylate).

*Example IV*

In a run generally similar to that of Example III the amount of acid was reduced to 123 cc. per minute at 38.8° F. while hydrocarbon feed at 173° F. was supplied at the rate of 24.3 cc. per minute. This resulted in a somewhat higher settler temperature of 102° F. but the quality of the alkylate was only slightly decreased.

*Example V*

Hydrocarbon feed similar to that of Example III at 170° F. was admitted to the reactor at the rate of 25.9 cc. per minute while liquid hydrogen fluoride at 59.5° F. was supplied at 203 cc. per minute. The settler temperature was 89° F. giving an alkylate of 0 bromine number and low fluoride content.

*Example VI*

Using an isobutane to butene ratio of 3.01 to 1, hydrocarbon feed was pumped at 30.6 cc. per minute and 176° F. into the reactor to which was supplied 153 cc. per minute of HF at 40.1° F. This gave a completely saturated alkylate in a yield of 187% based on butenes charged. The settler temperature was 87.4° F.

*Example VII*

At the isobutane to butene ratio of 3.66 to 1, 22.6 cc. per minute of hydrocarbon feed at 149° F. was sprayed with 146 cc. per minute of HF at 39.7° F. The bromine number was 0.1, the yield was approximately equal to that of Example VI and about half of the debutanized alkylate boiled in the octane range.

I claim:

1. The process of producing a high quality motor fuel component which comprises spraying cold liquid hydrogen fluoride into a vaporous mixture of isoparaffins and olefins, the temperature and relative amount of said hydrogen fluoride being such that substantially complete condensation of hydrocarbons is induced, settling the liquid mixture of hydrogen fluoride and hydrocarbons and recovering the desired product from the hydrocarbon layer.

2. The process of preparing a valuable motor fuel component which comprises continuously introducing a vapor phase mixture of isoparaffins and olefins to a reaction zone, continuously spraying into said mixture in said reaction zone cold liquid hydrogen fluoride at a rate and temperature such that substantially complete condensation of the hydrocarbons takes place, settling the liquid mixture to separate liquid hydrogen fluoride from liquid hydrocarbons and recovering the desired product from the hydrocarbon layer.

3. The process of claim 1 characterized in that said isoparaffin is isobutane and said olefin is butene.

4. The process of claim 2 characterized in that said isoparaffin is isobutane and said olefin is butene.

HAMILTON P. CALDWELL, JR.

REFERENCES CITED

The following references are of record in the file of this patent:

UNITED STATES PATENTS

| Number | Name | Date |
|---|---|---|
| 2,378,439 | Schlesman | June 19, 1945 |